(12) United States Patent
Huang et al.

(10) Patent No.: US 12,004,686 B2
(45) Date of Patent: Jun. 11, 2024

(54) HEATING CONTROL METHOD, APPARATUS AND DEVICE

(71) Applicant: Shenzhen Chenbei Technology Co., Ltd., Shenzhen (CN)

(72) Inventors: Weijie Huang, Shenzhen (CN); Zhende Zhong, Shenzhen (CN)

( * ) Notice: Subject to any disclaimer, the term of this patent is extended or adjusted under 35 U.S.C. 154(b) by 43 days.

(21) Appl. No.: 17/742,358

(22) Filed: May 11, 2022

(65) Prior Publication Data

US 2022/0361711 A1    Nov. 17, 2022

(30) Foreign Application Priority Data

May 14, 2021 (CN) .......................... 202110528384.4

(51) Int. Cl.
| | | |
|---|---|---|
| A47J 36/32 | (2006.01) |
| A23L 5/10 | (2016.01) |
| A47J 27/00 | (2006.01) |
| A47J 37/06 | (2006.01) |

(52) U.S. Cl.
CPC ................. *A47J 36/32* (2013.01); *A23L 5/10* (2016.08); *A47J 27/00* (2013.01); *A47J 37/0641* (2013.01); *A47J 2202/00* (2013.01)

(58) Field of Classification Search
CPC ..... A23L 5/10; A23L 5/15; A47J 36/32; A47J 36/321; A47J 37/0623; A47J 37/0629; A47J 37/0641; A47J 27/00; A47J 27/004; A47J 27/086; A47J 37/01; A47J 37/015; A47J 37/06; A47J 37/07; A47J 37/0709; A47J 37/08; A47J 37/0807; A47J 37/0842; A21B 1/14; A21B 1/145; A21B 1/22; A21B 1/02; A21B 1/06; A21B 1/40; F24C 1/14; F24C 7/00; F24C 7/04; F24C 7/046; F24C 7/06; F24C 7/067
USPC ........... 426/476; 99/325, 331, 332, 359, 389
See application file for complete search history.

(56) References Cited

U.S. PATENT DOCUMENTS

| | | | | |
|---|---|---|---|---|
| 5,534,678 A | * | 7/1996 | Bowles ................... | F24C 14/02 219/398 |
| 5,695,668 A | * | 12/1997 | Boddy ................. | H05B 6/6476 219/486 |
| 5,981,916 A | * | 11/1999 | Griffiths ................. | H05B 3/746 219/448.12 |
| 6,388,235 B1 | * | 5/2002 | Sauter ..................... | F24C 7/087 219/400 |
| 7,087,867 B2 | * | 8/2006 | Stockley ............. | A47J 37/0641 219/486 |
| 9,924,830 B1 | * | 3/2018 | Glucksman .......... | A47J 37/0611 |
| 2004/0035845 A1 | * | 2/2004 | Moon .................. | F24C 15/006 219/400 |

(Continued)

*Primary Examiner* — Drew E Becker
*Assistant Examiner* — Austin Parker Taylor
(74) *Attorney, Agent, or Firm* — Tsz Lung Yeung

(57) ABSTRACT

Embodiments of the application disclose a heating control method, device and apparatus. The device is internally provided with a first heating tube and a second heating tube, and a cooking cavity between the first heating tube and the second heating tube is configured to place to-be-heated food. When time reaches a switching time point, a magnitude relationship between heating temperatures of the first heating tube and the second heating tube is switched, so that the effect of turning the food can be achieved to enable the food to be heated uniformly, and prevent a situation in which the food is undercooked or burnt.

7 Claims, 3 Drawing Sheets

--- obtaining a target heating mode of a cooking device, the target heating mode including a switching time point of a magnitude relationship between heating temperatures of a first heating tube and a second heating tube  ─ 101

↓ controlling the heating temperatures of the first heating tube and the second heating tube, a non-zero temperature difference existing between the heating temperatures of the first heating tube and the second heating tube, and controlling the magnitude relationship between the heating temperatures of the first heating tube and the second heating tube to be switched when the switching time point is reached  ─ 102

(56) References Cited

U.S. PATENT DOCUMENTS

| | | | | |
|---|---|---|---|---|
| 2014/0234497 | A1* | 8/2014 | Sladecek | A47J 36/32 |
| | | | | 99/331 |
| 2017/0143151 | A1* | 5/2017 | Lemberg | A23L 5/13 |
| 2018/0259191 | A1* | 9/2018 | Polster | A47J 37/015 |
| 2018/0324906 | A1* | 11/2018 | Liu | H05B 6/80 |
| 2019/0059627 | A1* | 2/2019 | Kitatani | A47J 37/0629 |

* cited by examiner

HEATING CONTROL METHOD, APPARATUS AND DEVICE

CROSS REFERENCE

This is a non-provisional application which claims priority to a Chinese patent application having an application number of CN202110528384.4, and a filing date of May 14, 2021, the entire contents of which is hereby incorporated by reference.

TECHNICAL FIELD

The application relates to the field of home appliance technologies, and in particular, to a heating control method, apparatus and device, and a storage medium.

BACKGROUND

At present, an increasing number of types of home appliances, such as an air fryer and an oven, appear. When the products are used to heat food, the temperature of the front of the food is easily higher than that of the back of the food, and uniformity of food heating is relatively poor, easily making the back of the food undercooked or the front of the food burnt.

SUMMARY

A main objective of the application is to provide a heating control method, apparatus and device, and a storage medium, which can solve the problem in the prior art that uniformity of food heating is relatively poor, easily making the back of food undercooked or the front burnt.

To achieve the foregoing objective, according to a first aspect of the application, a heating control method is provided, where the method is applied to a cooking device, the device is internally provided with a first heating tube and a second heating tube, a cooking cavity between the first heating tube and the second heating tube is configured to place to-be-heated food, and the method includes:

obtaining a target heating mode of the cooking device, the target heating mode including a switching time point of a magnitude relationship between heating temperatures of the first heating tube and the second heating tube; and controlling the heating temperatures of the first heating tube and the second heating tube, a non-zero temperature difference existing between the heating temperatures of the first heating tube and the second heating tube, and controlling the magnitude relationship between the heating temperatures of the first heating tube and the second heating tube to be switched when the switching time point is reached.

Optionally, the obtaining a target heating mode of the cooking device includes:

in response to a preset menu selection operation, reading a first target heating mode corresponding to a menu selected by the preset menu selection operation;

or, in response to a customized cooking setup operation, obtaining a set target temperature value and a total heating duration, and determining a second target heating mode based on the target temperature value and the total heating duration.

Optionally, the first target heating mode further includes: a first temperature value of the first heating tube and a second temperature value of the second heating tube before the switching time point, and a third temperature value of the first heating tube and a fourth temperature value of the second heating tube after the switching time point, and a magnitude relationship between the first temperature value and the second temperature value is opposite to a magnitude relationship between the third temperature value and the fourth temperature value; and the controlling the magnitude relationship between the heating temperature s of the first heating tube and the second heating tube to be switched when the switching time point is reached includes:

when the switching time point is reached, the heating temperature of the first heating tube reaches the first temperature value, and the heating temperature of the second heating tube reaches the second temperature value, controlling the heating temperature of the first heating tube to be updated to the third temperature value, and controlling the heating temperature of the second heating tube to be updated to the fourth temperature value.

Optionally, the determining a second target heating mode based on the target temperature value and the total heating duration includes:

searching for a correspondence among a preset temperature value range, heating duration range and heating mode, and determining a heating mode in a correspondence in which a temperature value range includes the target temperature value and a heating duration range includes the total heating duration as the second target heating mode.

Optionally, before the controlling the heating temperatures of the first heating tube and the second heating tube, the method further includes:

determining a heating stage at which a switching time point in the second heating mode is based on the target temperature value, the total heating duration, and the switching time point in the second target heating mode; and determining heating temperatures of the first heating tube and the second heating tube before and after the switching time point based on the heating stage at which the switching time point is and the target temperature value, where a magnitude relationship between the heating temperatures of the first heating tube and the second heating tube before the switching time point is opposite to a magnitude relationship between the heating temperatures of the first heating tube and the second heating tube after the switching time point.

Optionally, the determining heating temperatures of the first heating tube and the second heating tube before and after the switching time point based on the heating stage at which the switching time point is and the target temperature value, where a magnitude relationship between the heating temperatures of the first heating tube and the second heating tube before the switching time point is opposite to a magnitude relationship between the heating temperatures of the first heating tube and the second heating tube after the switching time point includes:

for a temperature rise heating stage, determining sub-heating stages obtained by dividing the temperature rise heating stage by using switching time points included in the temperature rise heating stage, and determining core temperatures of the to-be-heated food in a process of temperature rise from a preset initial value to a fifth temperature value, the number of the core temperatures being less than or equal to the number of the sub-heating stages; and the core temperatures each being a temperature value estimated based on a heating temperature of the first heating tube and a heating temperature of the second heating tube, and the fifth temperature value being obtained by subtracting a first preset value from the target temperature value;

allocating the core temperatures to the sub-heating stages, the core temperature of a next sub-heating stage being greater than or equal to that of a previous sub-heating stage in time order; and determining heating temperatures of the first heating tube and the second heating tube before and after the switching time point based on a first rule, a second rule, and a third rule, where the first rule is that at the end of the last sub-heating stage, the heating temperature of one of the first heating tube and the second heating tube is the target temperature value, the heating temperature of the other heating tube is a sixth temperature value, and the sixth temperature value is obtained by subtracting the first preset value from the fifth temperature value; the second rule is that magnitude relationships between heating temperatures of the first heating tube and the second heating tube are opposite in two adjacent sub-heating stages; and the third rule is that the heating temperature of one of the first heating tube and the second heating tube is a sum of the core temperature of the sub-heating stage and the first preset value, and the heating temperature of the other heating tube is equal to a difference between the core temperature of the sub-heating stage and the first preset value.

Optionally, the method further includes:

for a constant temperature heating stage, determining heating temperatures before and after a switching time point of the constant temperature heating stage based on a fourth rule and a fifth rule, where the fourth rule is that the heating temperatures of the first heating tube and the second heating tube are the target temperature value and the sixth temperature value respectively or the sixth temperature value and the target temperature value respectively; and the fifth rule is that a magnitude relationship between the heating temperatures of the first heating tube and the second heating tube before the switching time point is opposite to a magnitude relationship between the heating temperatures of the first heating tube and the second heating tube after the switching time point.

To achieve the foregoing objective, according to a second aspect of the application, a heating control apparatus is provided, where the apparatus is applied to a cooking device, the device is internally provided with a first heating tube and a second heating tube, a cooking cavity between the first heating tube and the second heating tube is configured to place to-be-heated food, and the apparatus includes:

an obtaining circuitry, configured to obtain a target heating mode of the cooking device, the target heating mode including a switching time point of a magnitude relationship between heating temperatures of the first heating tube and the second heating tube; and a control circuitry, configured to control the heating temperatures of the first heating tube and the second heating tube, a non-zero temperature difference existing between the heating temperatures of the first heating tube and the second heating tube, and control the magnitude relationship between the heating temperatures of the first heating tube and the second heating tube to be switched when the switching time point is reached.

The embodiments of the application have the following advantages or beneficial effects:

The application provides a heating control method. The method is applied to a cooking device, the device is internally provided with a first heating tube and a second heating tube, and a cooking cavity between the first heating tube and the second heating tube is configured to place to-be-heated food. The method includes: obtaining a target heating mode of the cooking device, the target heating mode including a switching time point of a magnitude relationship between heating temperatures of the first heating tube and the second heating tube, controlling the heating temperatures of the first heating tube and the second heating tube, a non-zero temperature difference existing between the heating temperatures of the first heating tube and the second heating tube, and controlling the magnitude relationship between the heating temperatures of the first heating tube and the second heating tube to be switched when the foregoing switching time point is reached. When the time reaches the switching time point, the magnitude relationship between heating temperatures of the first heating tube and the second heating tube is switched, for example, when the heating temperature of the first heating tube is greater than the heating temperature of the second heating tube, under a condition that the switching time point is reached, the heating temperature of the second heating tube is controlled to be greater than the heating temperature of the first heating tube, so that the effect of turning the food can be achieved to enable the food to be heated uniformly, improve food cooking uniformity and cooking efficiency, and prevent a situation in which the food are undercooked or burnt.

BRIEF DESCRIPTION OF THE DRAWINGS

To explain the embodiments of the application or the technical solutions in the prior art more clearly, the following will briefly describe the accompanying drawings that need to be used in the description of the embodiments or the prior art. Obviously, the accompanying drawings in the following description show only some embodiments of the application, and a person of ordinary skill in the art can still derive other accompanying drawings from these accompanying drawings without creative efforts.

Among the figures.

DETAILED DESCRIPTION OF THE PREFERRED EMBODIMENT

The following clearly and completely describes the technical solutions in the embodiments of the application with reference to accompanying drawings in the embodiments of the application. Clearly, the described embodiments are merely some rather than all of the embodiments of the application. Based on the embodiments of the application, all other embodiments obtained by a person of ordinary skill in the art without creative efforts shall fall within the protection scope of the application.

A heating control method in an embodiment of the application is applied to a cooking device, the device is internally provided with a first heating tube and a second heating tube, and a cooking cavity between the first heating tube and the second heating tube is configured to place to-be-heated food, so that during heating, hot air can be generated from at least two directions to heat the food. The cooking device may be an oven, an air fryer oven, an air fryer, or the like.

As can be understood that the foregoing first heating tube and second heating tube may heat the food from different directions. In a feasible implementation, the foregoing first heating tube and second heating tube may be arranged vertically, that is, one heating tube is used as an upper heating tube, and the other heating tube is used as a lower heating tube. The cooking cavity between the two heating tubes can be used to place the to-be-heated food, so that the food can be heated vertically. As can be understood that in practical applications, the heating tubes may alternatively be arranged in more directions, which is not limited herein.

Figure 1:
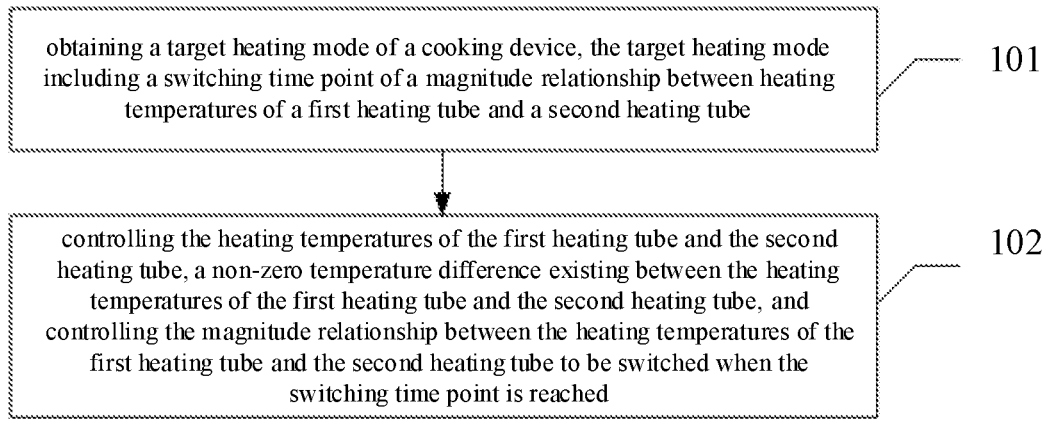
FIG. 1 is a schematic flowchart of a heating control method in an embodiment of the application.

To better understand the technical solutions in an embodiment of the application, refer to FIG. 1, which is a schematic flowchart of a heating control method in an embodiment of the application. The method includes:

step 101: obtaining a target heating mode of the cooking device, the target heating mode including a switching time point of a magnitude relationship between heating temperatures of the first heating tube and the second heating tube; and step 102: controlling the heating temperatures of the first heating tube and the second heating tube, a non-zero temperature difference existing between the heating temperatures of the first heating tube and the second heating tube, and controlling the magnitude relationship between the heating temperatures of the first heating tube and the second heating tube to be switched when the switching time point is reached.

In this embodiment of this application, the magnitude relationship includes a first magnitude relationship and a second magnitude relationship. The first magnitude relationship is that the heating temperature of the first heating tube is greater than the heating temperature of the second heating tube, and the second magnitude relationship is that the heating temperature of the first heating tube is less than the heating temperature of the second heating tube. The magnitude relationship switching refers to the switching from the first magnitude relationship to the second magnitude relationship, or the switching from the second magnitude relationship to the first magnitude relationship.

In this embodiment of the application, a target heating mode of the cooking device needs to be obtained. The target heating mode may be determined based on a user's selection of a menu or custom settings, where the target heating mode includes a switching time point of a magnitude relationship between heating temperatures of the first heating tube and the second heating tube.

When the heating temperatures of the first heating tube and the second heating tube are controlled, a non-zero temperature difference exists between the heating temperatures of the first heating tube and the second heating tube, so that hot air can flow in the cooking device by using the non-zero temperature difference to better implement heating. In addition, the magnitude relationship between the heating temperatures of the first heating tube and the second heating tube is switched at the switching time point, so that one side of the food at a high temperature is switched to one side of the food at a low temperature, and one side of the food at a low temperature is switched to one side of the food at a high temperature, and the flow direction of hot air can be affected to achieve an effect similar to that of turning the food, so as to improve uniformity of heating and improving food cooking uniformity and cooking efficiency. For example, under a condition that the foregoing first heating tube and second heating tube are the upper heating tube and the lower heating tube respectively, the magnitude relationship between the heating temperatures of the upper heating tube and the lower heating tube is changed to achieve an effect similar to that of turning the food over.

In this embodiment of the application, when the time reaches the switching time point, the magnitude relationship between the heating temperatures of the first heating tube and the second heating tube is switched, so that the effect of turning the food can be achieved to enable the food to be heated uniformly, improve food cooking uniformity and cooking efficiency, and prevent a situation in which the food is undercooked or burnt.

Further, at least two methods of obtaining the target heating mode of the cooking device in step 101 are provided. One method includes: in response to a preset menu selection operation, reading a first target heating mode corresponding to a menu selected by the preset menu selection operation. As can be understood that a surface of the cooking device is provided with buttons for preset menus. Taking an air fryer as an example, the menus that may be selected include: French fries, chicken wings, egg tarts, sweet potatoes, steak, prawns, cakes, skewers, and the like. A user may select a menu by pressing a corresponding button on the cooking device or touching a screen on the cooking device or remotely controlling the cooking device through a user terminal such as a mobile phone. As can be understood that the cooking device is preset with target heating modes of various menus, and the foregoing first target heating mode may be obtained by reading stored data of the menu selected by the user.

The other method may include: in response to a customized cooking setup operation, obtaining a set target temperature value and total heating duration, and determining a second target heating mode based on the target temperature value and the total heating duration. In this scenario, the user may set the target temperature value and the total heating duration through a setup module, and the cooking device may obtain the target temperature value and the total heating duration input by the user, and further determine the second target heating mode based on the target temperature value and the total heating duration. As can be understood that the first heating mode and the second heating mode are two cases of the foregoing target heating mode, and each include a switching time point for the heating temperatures of the first heating tube and the second heating tube.

To better understand the specific implementation solutions of the foregoing heating control method in the preset menu selection scenario and the customized cooking setup scenario, the following will describe the foregoing two scenarios.

I. Preset Menu Selection Scenario

In the preset menu selection scenario, the user selects a configured menu of the cooking device, and relevant cooking data of the menu has been saved in a storage medium of the cooking device. Therefore, in a feasible implementation, in addition to the switching time point for the heating temperatures of the first heating tube and the second heating tube, the foregoing first target heating mode may further include a first temperature value of the first heating tube and a second temperature value of the second heating tube before the switching time point, and a third temperature value of the first heating tube and a fourth temperature value of the second heating tube after the switching time point, and a magnitude relationship between the first temperature value and the second temperature value is opposite to a magnitude relationship between the third temperature value and the fourth temperature value.

In this scenario, based on the time sequence of the switching time point, the first temperature value and the second temperature value before the switching time point are used to control the first heating tube and the second heating tube, and when the switching time point is reached, the magnitude relationship between the heating temperatures of the first heating tube and the second heating tube is controlled to be switched, including: when the switching time point is reached, the heating temperature of the first heating tube reaches the first temperature value, and the heating temperature of the second heating tube reaches the second temperature value, controlling the heating temperature of the first heating tube to be updated to the third temperature value, and controlling the heating temperature of the second heating tube to be updated to the fourth temperature value.

In a possible implementation, taking the first heating tube and the second heating tube being the upper heating tube and the lower heating tube respectively as an example, after selecting a menu, the user may obtain a first target heating mode of the menu, including: switching time points time1-1, time1-2, and time2-1, as well as heating temperatures of an upper heating tube and a lower heating tube before and after each switching time point, for example: heating temperatures of the upper heating tube and the lower heating tube before time1-1 are Temple1-1$_{upper}$ and Temple1-1$_{lower}$ respectively, and heating temperatures of the upper heating tube and the lower heating tube after time1-1 are Temple1-2$_{upper}$ and Temple1-2$_{lower}$ respectively, where Temple1-1$_{upper}$ is greater than Temple1-1$_{lower}$, Temple1-2$_{upper}$ is less than Temple1-2$_{lower}$, and the magnitude relationships are opposite. As can be understood that, temperature values of the upper heating tube and the lower heating tube after a switching time point is temperature values of the upper heating tube and the lower heating tube before the next switching time point of this switching time point. Therefore, time1-2 is after time1-1, temperature values of the upper heating tube and the lower heating tube after time1-2 are Temple2-1$_{upper}$ and Temple2-1$_{lower}$ respectively, Temple2-1$_{upper}$ is greater than Temple2-1$_{lower}$, and the magnitude relationship is opposite to the magnitude relationship before time1-2 (Temple1-2$_{upper}$ is less than Temple1-2$_{lower}$ before). Time2-1 is after time1-2, temperature values of the upper heating tube and the lower heating tube after time time2-1 are Temple2-2$_{upper}$ and Temple2-2$_{lower}$ respectively, Temple2-1$_{upper}$ is less than Temple2-1$_{lower}$, and the magnitude relationship is opposite to the magnitude relationship before time2-1 (Temple2-1$_{upper}$ is greater than Temple2-1$_{lower}$ before).

As can be understood that in the embodiment of the application, the heating temperatures of the first heating tube and the second heating tube before and after a switching time point are each usually a desired temperature. In the actual heating process, the actual heating temperatures of the first heating tube and the second heating tube may be each controlled to be close to the desired temperature. A temperature difference of ±1° C. or ±2° C. usually exists between the actual heating temperature and the desired heating temperature.

In this embodiment of the application, in the preset menu selection scenario, the heating temperatures of the first heating tube and the second heating tube may be controlled by obtaining the configured first heating mode, and the magnitude relationship between the heating temperatures of the first heating tube and the second heating tube is switched when a switching time point is reached, so that the effect of turning the food can be achieved to enable the food to be heated uniformly, improve food cooking uniformity and cooking efficiency, and prevent a situation in which the food is undercooked or burnt.

II. Custom Cooking Setup Scenario

In the customized cooking setup scenario, the user may configure by inputting the target temperature value and the total heating duration, and the cooking device may obtain the target temperature value and the total heating duration, and determine the second target heating mode based on the target temperature value and the total heating duration. As can be understood that the second heating mode also includes a switching time point for the heating temperatures of the first heating tube and the second heating tube.

In a feasible implementation, longer total heating duration indicates a larger number of switching time points, shorter total heating duration indicates a smaller number of switching time points, and a switching time point may be determined based on the total heating duration. For example, under a condition that total heating duration is t and the total heating duration is less than a preset duration threshold, it is determined that the switching times of the switching relationship between the heating temperatures of the first heating tube and the second heating tube are once. That is, one switching time point is provided, and the switching time point is 0.5t, so that the magnitude relationship can be switched at 0.t in the heating process. For another example, under a condition that the total heating duration is t, and the total heating duration is greater than the preset duration threshold, it is determined that the switching times of the magnitude relationship between the heating temperatures of the first heating tube and the second heating tube are twice. That is, two switching time points are provided, and the two switching time points are 0.33t and 0.66t respectively.

In another feasible implementation, in the customized cooking setup scenario, the user may further input a name of to-be-cooked food, which may be, for example, chicken wings or French fries, so that the switching time point may be further determined based on the food name, target temperature value and total heating duration input by the user. For example, under a condition that the food is chicken wings, the input target temperature value is 20° C., the total heating duration is 12 minutes, and two set switching time points are provided, then the first switching time point is at the 0.5×12=6$^{th}$ minute, and the second switching time point is at the 6+⅓×12=10th minute. That is, the magnitude relationship between heating temperatures of the first heating tube and the second heating tube is switched at the 6$^{th}$ and 10$^{th}$ minutes of heating. For another example, under a condition that the food is French fries, the input target temperature value is 200° C., the total heating duration is 18 minutes, and two set switching time points are provided, then the first switching time point is at the 0.5×18=9$^{th}$ minute, and the second switching time point is at the 9+⅓×18=15$^{th}$ minute. That is, the magnitude relationship between heating temperatures of the first heating tube and the second heating tube is switched at the 6$^{th}$ and 15$^{th}$ minutes of heating.

In a still another implementation, the second heating mode may be determined by using the following method, which includes: searching for a correspondence among a preset temperature value range, heating duration range and heating mode, and determining a heating mode in a correspondence in which a temperature value range includes the target temperature value and a heating duration range includes the total heating duration as the second target heating mode. The correspondence may be determined by using an experiment.

As can be understood that the second heating mode included in the foregoing correspondence includes a switching time point of a magnitude relationship between heating temperatures of the first heating tube and the second heating tube.

Figure 2:
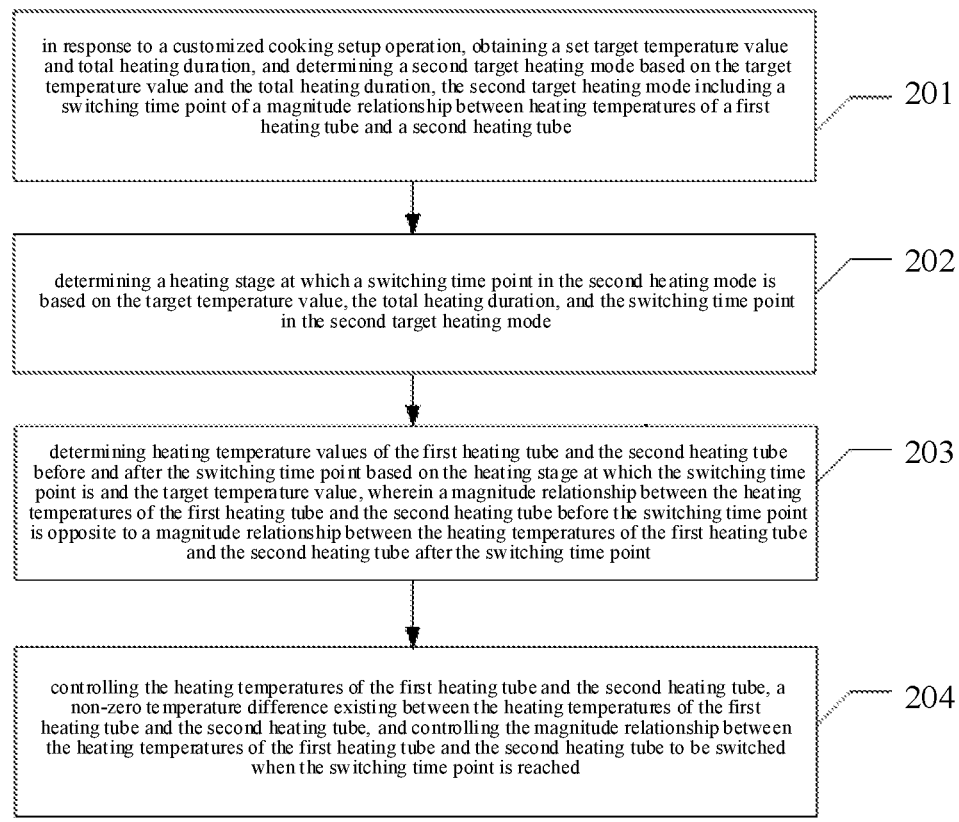
FIG. 2 is another schematic flowchart of a heating control method in an embodiment of the application.

In the foregoing feasible implementation, to better control the first heating tube and the second heating tube, heating temperatures before and after a switching time point may be further determined. Referring to FIG. 2, another schematic flowchart of a heating control method in an embodiment of the application is provided. The method includes:

step 201: in response to a customized cooking setup operation, obtaining a set target temperature value and total heating duration, and determining a second target heating mode based on the target temperature value and the total heating duration, the second target heating mode including a switching time point of a magnitude relationship between heating temperatures of a first heating tube and a second heating tube;

step 202: determining a heating stage at which a switching time point in the second heating mode is based on the target temperature value, the total heating duration, and the switching time point in the second target heating mode; and step 203: determining heating temperatures of the first heating tube and the second heating tube before and after the switching time point based on the heating stage at which the switching time point is and the target temperature value, where a magnitude relationship between the heating temperatures of the first heating tube and the second heating tube before the switching time point is opposite to a magnitude relationship between the heating temperatures of the first heating tube and the second heating tube after the switching time point; and step 204: controlling the heating temperatures of the first heating tube and the second heating tube, a non-zero temperature difference existing between the heating temperatures of the first heating tube and the second heating tube, and controlling the magnitude relationship between the heating temperatures of the first heating tube and the second heating tube to be switched when the switching time point is reached.

As can be understood that step 201 has been described in the foregoing embodiment, reference may be made to the content in the foregoing method embodiment, and details are not described herein.

A heating stage at which a switching time point in the second heating mode is may be determined based on the target temperature value, the total heating duration, and the switching time point in the second target heating mode. As can be understood that the heating stage includes at least a temperature rise heating stage and a constant temperature heating stage. The temperature rise heating stage refers to a stage at which a core temperature of the food rises, and the constant temperature heating stage refers to a stage at which the core temperature of the food remains unchanged. The core temperature is estimated based on the heating temperatures of the first heating tube and the second heating tube, and may represent a temperature value of the center of the food. In a feasible implementation, the core temperature may be an average value of the heating temperatures of the first heating tube and the second heating tube, or the core temperature may be an average temperature in the cooking cavity of the cooking device after the first heating tube and the second heating tube are operated.

As can be understood that maximum heating power that can be used in the temperature rise heating stage during customized cooking setup by the user, and then first duration required for the core temperature of the to-be-heated food to rise from a preset initial value to a fifth temperature value can be determined. The fifth temperature value is obtained by subtracting a first preset value from the target temperature value, may be used as a final core temperature of the food, and is also a core temperature of the constant temperature heating stage.

After the first duration is obtained, a ratio of the first duration to the total heating duration is determined. Under a condition that the ratio is within a preset ratio range, such as 40%-70%, the first duration is determined as duration of the temperature rise heating stage. Under a condition that the ratio is greater than the maximum value of the preset ratio range, a prompt voice is output to remind the user that the set total heating duration is excessively short and needs to be extended. Under a condition that the ratio is less than the minimum value of the preset ratio range, the product of the minimum value and the total heating duration is used as the duration of the temperature rise heating stage, and the power used in the temperature rise heating stage is adjusted based on the duration, so that the duration of the temperature rise heating stage and the constant temperature heating stage can be effectively determined. In addition, the duration is reasonable to ensure the cooking effect of the food.

As can be understood that the remaining time obtained by subtracting the duration of the temperature rise heating stage from the total heating duration is the duration of the constant temperature heating stage. After the duration division for the two heating stages is determined, a stage which each switching time point is in may be determined based on the switching time point. For example, the total heating duration is 60 minutes, where the first 30 minutes is the temperature rise heating stage, the last 30 minutes is the constant temperature heating stage, and switching time points are at the $10^{th}$ minute, the $20^{th}$ minute, the $30^{th}$ minute, the $40^{th}$ minute, and the $50^{th}$ minute. Therefore, it can be determined that the temperature rise heating stage includes switching time points at the $10^{th}$ minute, the $20^{th}$ minute, and the $30^{th}$ minute, and the constant temperature heating stage includes switching time points at the $40^{th}$ minute and the $50^{th}$ minute.

Further, heating temperatures of the first heating tube and the second heating tube before and after the switching time point may be determined based on the heating stage at which the switching time point is and the target temperature value, where a magnitude relationship between the heating temperatures of the first heating tube and the second heating tube before the switching time point is opposite to a magnitude relationship between the heating temperatures of the first heating tube and the second heating tube after the switching time point.

Specifically, a method for determining heating temperatures before and after switching time points of the temperature rise heating stage and a method for determining heating temperatures before and after switching time points of the constant temperature heating stage are separately described below:

In the temperature rise heating stage, the method includes the following steps.

Step a1: determining sub-heating stages obtained by dividing the temperature rise heating stage by using switching time points included in the temperature rise heating stage, and determining core temperatures of the to-be-heated food in a process of temperature rise from a preset initial value to a fifth temperature value, the number of the core temperatures being less than or equal to the number of the sub-heating stages.

As can be understood that under a condition that the temperature rise heating stage includes three switching time points, and the last switching time point is a joint point of the temperature rise heating stage and the constant temperature heating stage, the temperature rise heating stage is divided into three sub-heating stages; and under a condition that the temperature rise heating stage includes three switching time points, and the last switching time point is not the joint point of the temperature rise heating stage and the constant temperature heating stage, the temperature rise heating stage is divided into four sub-heating stages.

The fifth temperature value is the final core temperature, that is, several different core temperatures which the heated food needs to undergo during temperature rise from the preset initial value to the fifth temperature value are determined, where the number of core temperatures is less than or equal to the number of the sub-heating stages. In a feasible implementation, several different core temperatures which the food needs to undergo during temperature rise from the initial value to the fifth temperature value may be determined by using preset ratios. For example, the preset ratios may be 30%, 60%, and 100%, and it can be determined that under a condition that the fifth temperature value is 100° C., the core temperatures include: 30° C., 60° C., and 100° C. In another feasible implementation, the core temperatures during the temperature rise may alternatively be determined by using a preset increment value. For example, the preset increment value is 50° C., the initial value is the ambient temperature value of 0° C., the fifth temperature value is 200° C., and then it can be determined that the core temperatures during the temperature rise include: 50° C., 100° C., 150° C., and 200° C.

Step a2: allocating the core temperatures to the sub-heating stages, the core temperature of a next sub-heating stage being greater than or equal to that of a previous sub-heating stage in time order.

Figure 3:
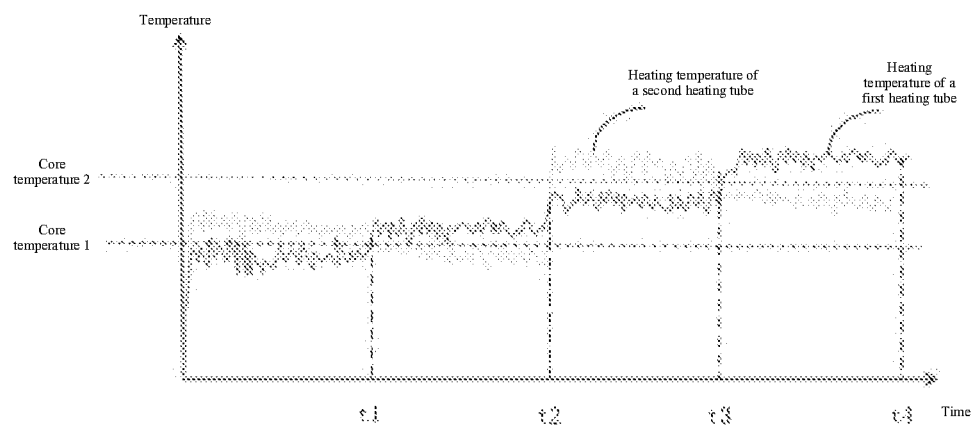
FIG. 3 is a schematic flowchart of changes of heating temperatures in an embodiment of the application.

For example, the core temperatures are b1, b2, and b3 with increasing temperature values, and three sub-heating stages are provided, and are c1, c2, and c3 in time order. Then the sub-heating stage c1 corresponds to the core temperature b1, the sub-heating stage c2 corresponds to the core temperature b2, and the sub-heating stage c3 corresponds to the core temperature b3. As can be understood that at the sub-heating stage c1, the core temperature first rises to b1 and then is kept until the sub-heating stage c2 is entered, the temperature rises to the core temperature b2 and is kept, and when the sub-heating stage c3 is entered, the temperature rises to the core temperature b3 and is kept. As can be understood that when the number of core temperatures is less than the number of sub-heating stages, two or more adjacent sub-heating stages may have the same core temperatures. Referring to FIG. 3, a schematic diagram of changes of heating temperatures in an embodiment of the application is provided. In FIG. 3, the core temperatures include a core temperature 1 and a core temperature 2, the core temperature 1 is less than the core temperature 2, switching time points include t1, t2, and t3, four sub-heating stages are provided, where 0-t1 is a sub-heating stage 1, t1-t2 is a sub-heating stage 2, t2-t3 is a sub-heating stage 3, and t3-t4 is a sub-heating stage 4. It can be learned from the figure that the sub-heating stage 1 and the sub-heating stage 2 have the same core temperature, and the sub-heating stage 3 and the sub-heating stage 4 have the same core temperature. Before the switching time point t1, the heating temperature of the second heating tube is greater than the heating temperature of the first heating tube; and after the switching time point t1, the heating temperature of the second heating tube is lower than the heating temperature of the first heating tube, which implements the switching of the magnitude relationship.

Step a3: determining heating temperatures of a first heating tube and the second heating tube before and after the switching time point based on a first rule, a second rule, and a third rule.

In this embodiment of the application, the first rule, the second rule and the third rule are set. The first rule is that at the end of the last sub-heating stage, the heating temperature of one of the first heating tube and the second heating tube is the target temperature value, the heating temperature of the other heating tube is a sixth temperature value, and the sixth temperature value is obtained by subtracting the first preset value from the fifth temperature value. In this way, at the end of the last sub-heating stage of the temperature rise heating stage, the core temperature determined by using the heating temperatures of the first heating tube and the second heating tube may be the fifth temperature, so that the final core temperature is reached, and a constant temperature state is kept after the constant temperature heating stage is entered.

The second rule is that magnitude relationships between heating temperatures of the first heating tube and the second heating tube are opposite in two adjacent sub-heating stages. Because the joint point of two adjacent sub-heating stages is a switching time point, the magnitude relationship between the heating temperatures of the first heating tube and the second heating tube can be effectively switched at the switching time point.

The third rule is that the heating temperature of one of the first heating tube and the second heating tube is a sum of the core temperature of the sub-heating stage of the heating tube and the first preset value, and the heating temperature of the other heating tube is equal to a difference between the core temperature of the sub-heating stage of the other heating tube and the first preset value, so that the core temperature can be used to reversely determine the heating temperatures of the first heating tube and the second heating tube before and after a switching time point.

To better understand the foregoing technical solution, an example will be given below for description.

Duration of the temperature rise heating stage is 40 minutes, and switching time points are at the $20^{th}$ minute, the $30^{th}$ minute, and the $40^{th}$ minute, sub-heating stages obtained by division are a stage 1 (0-$20^{th}$ minute), a stage 2 ($20^{th}$ minute-$30^{th}$ minute), and a stage 3 ($30^{th}$ minute-$40^{th}$ minute), a target temperature value is 150° C., a first preset value is 2° C., and then a fifth temperature value is 148° C. Core temperatures during temperature rising from a preset initial value to the fifth temperature value of 148° C. are 48° C., 98° C., and 148° C. respectively, and then it is determined that the core temperature of the stage 1 is 48° C., the core temperature of the stage 2 is 98° C., and the core temperature of the stage 3 is 148° C. It can be determined based on the foregoing data that in the stage 1, the heating temperature of the first heating tube is 50° C., the heating temperature of the second heating tube is 46° C., and the heating temperature of the first heating tube is greater than the heating temperature of the second heating tube; in the stage 2, because the magnitude relationship needs to be opposite to the magnitude relationship in the stage 1, the heating temperature of the first heating tube is lower than the heating temperature of the second heating tube, the heating temperature of the first heating tube is 96° C., and the heating temperature of the second heating tube is 100° C.; in the stage 3, because the magnitude relationship needs to be opposite to the magnitude relationship in the stage 2, the heating temperature of the first heating tube is greater than the heating temperature of the second heating tube, the heating temperature of the first heating tube is 150° C., and the heating temperature of the second heating tube is 146° C. In addition, during the heating, the heating temperatures of the first heating tube and the second heating tube are controlled to rise to 50° C. and 46° C. respectively, and after the heating temperatures rise to these temperatures, these temperatures are kept for heating in the stage 1; when the switching time point at the $20^{th}$ minute is reached, the heating temperatures of the first heating tube and the second heating tube are controlled to rise to 96° C. and 100° C. respectively, and after these temperatures are reached, these temperatures are kept for heating in the stage 2; and when the switching time point at 40 minutes is reached, the heating temperatures of the first heating tube and the second heating tube are controlled to rise to 146° C. and 150° C. respectively. From this, it can be determined that the heating temperatures of the first heating tube and the second heating tube are 50° C. and 46° C. respectively before the switching time point at the $20^{th}$ minute, the heating temperatures of the first heating tube and the second heating tube are 96° C. and 100° C. respectively after the switching time point at the $20^{th}$ minute, and the heating temperatures before and after other switching time points may be deduced by analogy to meet the foregoing first rule, second rule and third rule.

As can be understood that at the end of the temperature rise heating stage, a constant temperature heating stage is entered. For the constant temperature heating stage, a method for determining heating temperatures of the first heating tube and the second heating tube before and after a switching time point includes: for the constant temperature heating stage, determining heating temperatures before and after a switching time point of the constant temperature heating stage based on a fourth rule and a fifth rule, where the fourth rule is that the heating temperatures of the first heating tube and the second heating tube are the target temperature value and the sixth temperature value respectively or the sixth temperature value and the target temperature value respectively; and the fifth rule is that a magnitude relationship between the heating temperatures of the first heating tube and the second heating tube before the switching time point is opposite to a magnitude relationship between the heating temperatures of the first heating tube and the second heating tube after the switching time point.

As can be understood that in the last sub-heating stage of the temperature rise heating stage, the core temperature in the cooking device has risen to the final core temperature, that is, the fifth temperature. In this case, the heating temperature of one of the first heating tube and the second heating tube is the target temperature value, and the heating temperature of the other heating tube is the sixth temperature value. Because the core temperature needs to be kept constant at the constant temperature heating stage, the heating temperatures of the first heating tube and the second heating tube are switched between the target temperature value and the sixth temperature value.

The example of the temperature rise heating stage is used to continue the description. In the last sub-heating stage of the temperature rise heating stage, the heating temperatures of the first heating tube and the second heating tube rise to 146° C. and 150° C. respectively, where 150° C. is the target temperature value, and 146° C. is the sixth temperature value. After the constant temperature heating stage is entered, under a condition that the duration of the constant temperature heating stage is 30 minutes, a switching time point 1 is at the $10^{th}$ minute, and a switching time point 2 is at the $20^{th}$ minute, and the heating temperatures of the first heating tube and the second heating tube before the switching time point 1 are 146° C. and 150° C. respectively, and the heating temperatures after the switching time point 1 are 150° C. and 146° C. respectively, and so on. The heating temperatures before the switching time point 2 are 150° C. and 146° C. respectively, and the heating temperatures after the switching time point 2 are 146° C. and 150° C. respectively, which complies with the foregoing fourth rule and fifth rule.

As can be understood that after heating temperatures before and after each switching time point in the second target mode are determined, heating temperatures of the first heating tube and the second heating tube can be controlled based on the switching time point and the heating temperatures before and after the switching time point, so that the effect of turning the food can be achieved to enable the food to be heated uniformly, improve food cooking uniformity and cooking efficiency, and prevent a situation in which the food is undercooked or burnt.

In this embodiment of the application, the switching time points is not limited. For example, the total heating duration is 20 minutes, where the first 5 minutes is the temperature rise heating stage, the last 25 minutes is the constant temperature heating stage, and the switching time point is 15 minutes. Therefore, it can be determined that the switching time point of the entire cooking process is at the $15^{th}$ minute.

Further, when the heating temperatures of the foregoing first heating tube and second heating tube are controlled, a PID algorithm (including a proportional control algorithm, an integral control algorithm, and a derivative control algorithm) may be used. This algorithm may be used to eliminate an error in the temperature control process, so that the heating temperatures of the first heating tube and the second heating tube can reach desired temperature values, and therefore the core temperature of the food can be controlled to be stable by controlling the heating temperatures of the first heating tube and the second heating tube. As can be understood that the foregoing heating control method may be implemented on the basis of the PID algorithm, that is, after the heating temperatures of the first heating tube and the second heating tube are controlled at determined temperature values by using the PID algorithm, switching is performed at a switching time point to achieve an effect similar to that of turning the food.

As can be understood that in the foregoing preset menu selection scenario or customized cooking setup scenario, after completing the cooking process, the cooking device may enter a heat preservation mode, and after the heat preservation mode is kept for preset duration, the cooking device enters a cooling mode. The preset mode may refer to duration set by the user, or the cooking device may directly enter the cooling mode after completing the cooking process. Under a condition that the heat preservation mode is selected, after the cooking process is over, an on-off time interval of the first heating tube and the second heating tube of the cooking device is extended, and a fan operates at a speed of 800 RMP. After it is ensured that the food meets temperature standard ≥140° F. under international requirements for heat preservation of food, the effect of not affecting the taste and appearance of the food also needs to be achieved. At the end of the heat preservation mode, the cooling mode is entered. In this case, the first heating tube or the second heating tube can be controlled to operate, for example, the lower heating tube may operate, the operating heating tube decreases power by 10%-30%, and the fan operates at 800 RMP.

Figure 4:
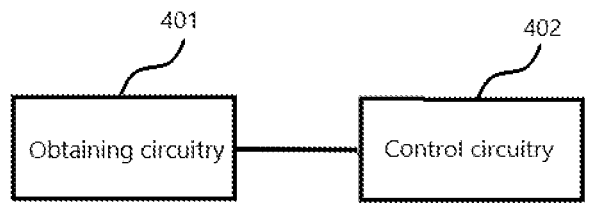
FIG. 4 is a structural block diagram of a heating control apparatus in an embodiment of the application.

Referring to FIG. 4, a schematic structural diagram of a heating control apparatus in an embodiment of the application is provided. The apparatus is applied to a cooking device, the cooking device is internally provided with a first heating tube and a second heating tube, a cooking cavity between the first heating tube and the second heating tube is configured to place to-be-heated food, and the apparatus includes:

an obtaining circuitry 401, configured to obtain a target heating mode of the cooking device, the target heating mode including a switching time point of a magnitude relationship between heating temperatures of the first heating tube and the second heating tube; and a control circuitry 402, configured to control the heating temperatures of the first heating tube and the second heating tube, a non-zero temperature difference existing between the heating temperatures of the first heating tube and the second heating tube, and control the magnitude relationship between the heating temperatures of the first heating tube and the second heating tube to be switched when the switching time point is reached.

In an optional implementation, the obtaining circuitry 401 includes:

a first response circuitry, configured to, in response to a preset menu selection operation, read a first target heating mode corresponding to a menu selected by the preset menu selection operation; and a first response circuitry, configured to, in response to a customized cooking setup operation, obtain a set target temperature value and total heating duration, and determine a second target heating mode based on the target temperature value and the total heating duration.

In an optional implementation, the first target heating mode further includes: a first temperature value of the first heating tube and a second temperature value of the second heating tube before the switching time point, and a third temperature value of the first heating tube and a fourth temperature value of the second heating tube after the switching time point, and a magnitude relationship between the first temperature value and the second temperature value is opposite to a magnitude relationship between the third temperature value and the fourth temperature value; and the control circuitry 402 is specifically configured to control the heating temperatures of the first heating tube and the second heating tube, a non-zero temperature difference existing between the heating temperatures of the first heating tube and the second heating tube, and when the switching time point is reached, the heating temperature of the first heating tube reaches the first temperature value, and the heating temperature of the second heating tube reaches the second temperature value, control the heating temperature of the first heating tube to be updated to the third temperature value, and control the heating temperature of the second heating tube to be updated to the fourth temperature value.

In a feasible implementation, a first response circuitry is configured to, in response to a customized cooking setup operation, obtain a set target temperature value and total heating duration, search for a correspondence among a preset temperature value range, heating duration range and heating mode, and determine a heating mode in a correspondence in which a temperature value range includes the target temperature value and a heating duration range includes the total heating duration as the second target heating mode.

In a feasible implementation, before the control circuitry 402, the heating control apparatus further includes:

a first determining circuitry, configured to determine a heating stage at which a switching time point in the second heating mode is based on the target temperature value, the total heating duration, and the switching time point in the second target heating mode; and a second determining circuitry, configured to determine heating temperatures of the first heating tube and the second heating tube before and after the switching time point based on the heating stage at which the switching time point is and the target temperature value, where a magnitude relationship between the heating temperatures of the first heating tube and the second heating tube before the switching time point is opposite to a magnitude relationship between the heating temperatures of the first heating tube and the second heating tube after the switching time point.

In a feasible implementation, the second determining circuitry is configured to, for a temperature rise heating stage, determine sub-heating stages obtained by dividing the temperature rise heating stage by using switching time points included in the temperature rise heating stage, and determine core temperatures of the to-be-heated food in a process of temperature rise from a preset initial value to a fifth temperature value, the number of the core temperatures being less than or equal to the number of the sub-heating stages; the core temperatures each being a temperature value estimated based on a heating temperature of the first heating tube and a heating temperature of the second heating tube, and the fifth temperature value being obtained by subtracting a first preset value from the target temperature value; allocate the core temperatures to the sub-heating stages, the core temperature of a next sub-heating stage being greater than or equal to that of a previous sub-heating stage in time order; and determine heating temperatures of the first heating tube and the second heating tube before a switching time point and heating temperatures of the first heating tube and the second heating tube after the switching time point based on a first rule, a second rule, and a third rule, where the first rule is that at the end of the last sub-heating stage, the heating temperature of one of the first heating tube and the second heating tube is the target temperature value, the heating temperature of the other heating tube is a sixth temperature value, and the sixth temperature value is obtained by subtracting the first preset value from the fifth temperature value; the second rule is that magnitude relationships between heating temperatures of the first heating tube and the second heating tube are opposite in two adjacent sub-heating stages; and the third rule is that the heating temperature of one of the first heating tube and the second heating tube is a sum of the core temperature of the sub-heating stage of the heating tube and the first preset value, and the heating temperature of the other heating tube is equal to a difference between the core temperature of the sub-heating stage of the other heating tube and the first preset value. The second determining circuitry is further configured to, for a constant temperature heating stage, determine heating temperatures before and after a switching time point of the constant temperature heating stage based on a fourth rule and a fifth rule, where the fourth rule is that the heating temperatures of the first heating tube and the second heating tube are the target temperature value and the sixth temperature value respectively or the sixth temperature value and the target temperature value respectively; and the fifth rule is that a magnitude relationship between the heating temperatures of the first heating tube and the second heating tube before the switching time point is opposite to a magnitude relationship between the heating temperatures of the first heating tube and the second heating tube after the switching time point.

In this embodiment of the application, when the time reaches the switching time point, the magnitude relationship between heating temperatures of the first heating tube and the second heating tube is switched, for example, when the heating temperature of the first heating tube is greater than the heating temperature of the second heating tube, under a condition that the switching time point is reached, the heating temperature of the second heating tube is controlled to be greater than the heating temperature of the first heating tube, so that the effect of turning the food can be achieved to enable the food to be heated uniformly, improve food cooking uniformity and cooking efficiency, and prevent a situation in which the food are undercooked or burnt.

Figure 5:
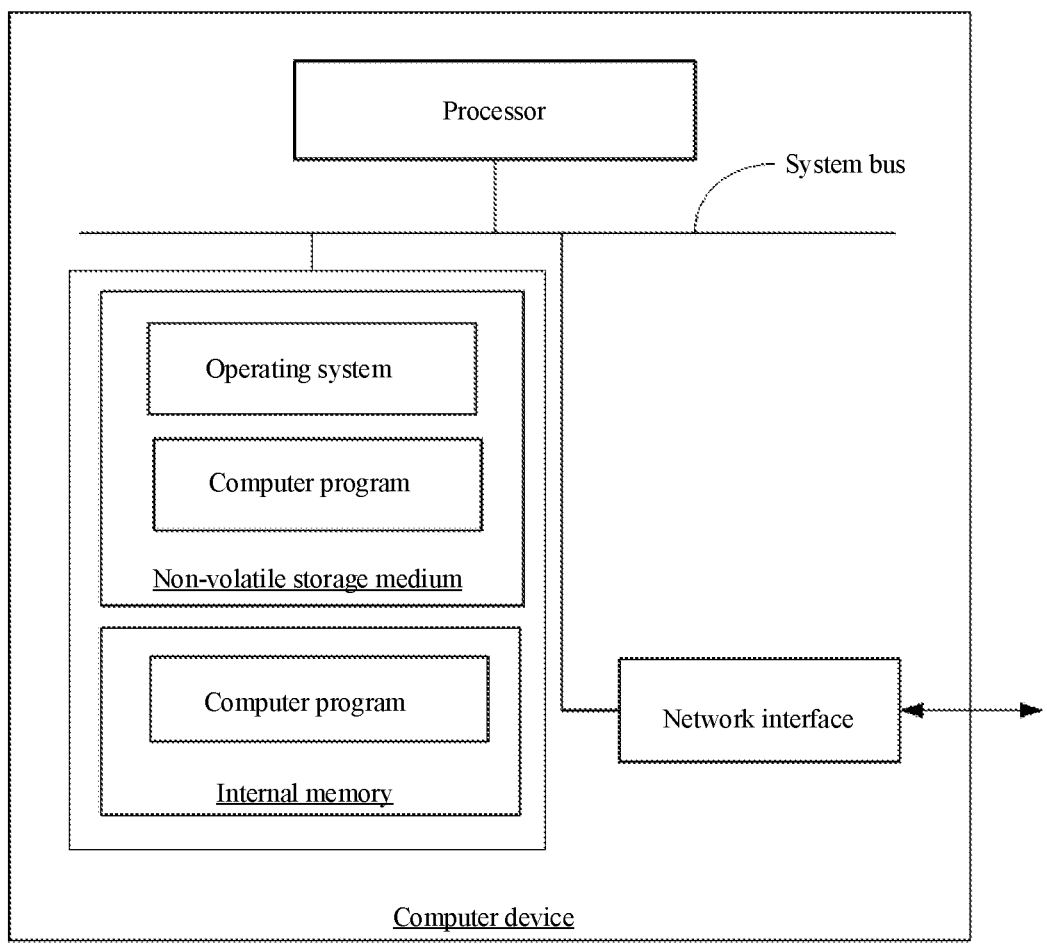
FIG. 5 is a structural block diagram of a computer device in an embodiment of the application.

FIG. 5 is an internal structural diagram of a computer device in an embodiment. The computer device may specifically be a cooking device such as an air fryer or an oven. As shown in FIG. 5, the computer device includes a processor, a memory and a network interface that are connected to one another through a system bus. The memory includes a non-volatile storage medium and an internal memory. The non-volatile storage medium of the computer device stores an operating system, and may further store a computer program, and when the computer program is executed by the processor, the processor is enabled to perform each step of the foregoing method embodiment. The internal memory may also store a computer program, and when the computer program is executed by the processor, the processor is enabled to perform each step of the foregoing method embodiment. A person skilled in the art may understand that the structure shown in FIG. 5 is only a block diagram of a part of the structure related to the solution of the application, and does not constitute a limitation to the computer device to which the solution of the application is applied. The specific computer device may include more or fewer components than those shown in the figure, or combine some components, or have different component arrangements.

The cooking device may further include: a first temperature sensor and a second temperature sensor. The first temperature sensor can detect a temperature in the cooking cavity that is close to the first heating tube and far away from the second heating tube, and the processor can be connected to the first temperature sensor to control the operation of the first heating tube based on a temperature detection result of the first temperature sensor. The second temperature sensor can detect a temperature in the cooking cavity that is close to the second heating tube and far away from the first heating tube, and the processor can be connected to the second temperature sensor to control the operation of the second heating tube based on a temperature detection result of the second temperature sensor.

In an embodiment, a computer device is provided, including a memory and a processor, where a computer program is stored in the memory, and when the computer program is executed by a processor, the processor is enabled to perform each step of the foregoing method embodiment.

In an embodiment, a computer-readable storage medium storing a computer program is provided, where when the computer program is executed by a processor, the processor is enabled to perform each step of the foregoing method embodiment.

A person of ordinary skill in the art may understand that all or some processes in the methods of the foregoing embodiments may be implemented by instructing relevant hardware through a computer program. The program may be stored in a non-volatile computer-readable storage medium, and when the program is executed, the processes according to the embodiment of each of the foregoing methods may be included. Any reference to a memory, a storage, a database or other media used in each embodiment of the application may include a non-volatile memory and/or volatile memory. The non-volatile memory may include a read-only memory (ROM), a programmable ROM (PROM), an electrically programmable ROM (EPROM), an electrically erasable programmable ROM (EEPROM), or a flash memory. The volatile memory may include a random access memory (RAM) or an external cache. As an illustration and not a limitation, an RAM is available in many forms, such as a static RAM (SRAM), a dynamic RAM (DRAM), a synchronous DRAM (SDRAM), a double data rate SDRAM (DDRSDRAM), an enhanced SDRAM (ESDRAM), a synchronous link DRAM (SLDRAM), a Rambus direct RAM (RDRAM), a direct Rambus dynamic RAM (DRDRAM), a Rambus dynamic RAM (RDRAM), or the like.

The technical features of the foregoing embodiments may be combined arbitrarily. To make the description concise, not all possible combinations of the various technical features in the foregoing embodiments are described. However, provided that no contradiction occurs to the combinations of these technical features, all the combinations should be considered as falling within the scope of the specification.

The foregoing embodiments only express several implementations of the application, and the description thereof is relatively specific and detailed, but it should not be understood as a limitation to the patent scope of the application. It should be noted that a person of ordinary skill in the art may further make several modifications and improvements without departing from the conception of the application. These modifications and improvements shall fall within the protection scope of the application. Therefore, the patent protection scope of the application should be subject to the appended claims.

What is claimed is:

1. A heating control method for a cooking device comprising a first heating tube, a second heating tube, and a cooking cavity formed between the first heating tube and the second heating tube for heating food, the method comprising the steps of:
   (a) obtaining a target heating mode of the cooking device, the target heating mode comprising a switching time point, one of a first magnitude relationship and a second magnitude relationship between heating temperatures of the first heating tube and the second heating tube, the first magnitude relationship being defined as the heating temperature of the first heating tube is greater than the heating temperature of the second heating tube,
   the second magnitude relationship being defined as the heating temperature of the first heating tube is less than the heating temperature of the second heating tube; and
   (b) controlling the heating temperatures of the first heating tube and the second heating tube to achieve a non-zero temperature difference between the heating temperatures of the first heating tube and the second heating tube and (c) when the switching time point is reached, controlling the temperatures of the first heating tube and the second heating tube by switching from the first magnitude relationship to the second magnitude relationship or vice versa so as to achieve an effect of turning the food;

wherein step (a) comprises the steps of:

in response to a customized cooking setup operation, obtaining a set target temperature value and a total heating duration to determine the target heating mode based on the target temperature value and the total heating duration;

wherein the step (a) further comprises the steps of setting a number of switch time points based on the total heating duration.

2. The method, as recited in claim 1, wherein the step (a) further comprises the steps of:

searching for correspondences among a plurality of preset temperature value ranges and the corresponding heating duration ranges; and selecting one of the preset temperature value ranges and the corresponding heating duration ranges to be the target heating mode, the correspondences being determined by at least one experiment.

3. The method, as recited in claim 1, wherein the step (a) further comprises the steps of:

determining a heating stage based on the selected target temperature value, the selected total heating duration, and the selected switching time point in the target heating mode; and determining heating temperatures of the first heating tube and the second heating tube before and after the switching time point based on the heating stage for the corresponding first magnitude relationship and the second magnitude relationship.

4. The method, as recited in claim 2, wherein the step (a) further comprises the steps of:

determining at least one heating stage based on the selected target temperature value, the selected total heating duration, and the selected switching time point in the target heating mode; and determining heating temperatures of the first heating tube and the second heating tube before and after the switching time point based on the heating stage for the corresponding first magnitude relationship and the second magnitude relationship.

5. The method, as recited in claim 4, wherein the heating stage includes at least a temperature rise heating stage and a constant temperature heating stage, wherein the temperature rise heating stage refers to a stage at which a core temperature of the food rises, and the constant temperature heating stage refers to a stage at which the core temperature of the food remains approximately unchanged.

6. The method, as recited in claim 5, wherein the step (a) further comprises the steps of:

determining sub-heating stages obtained by dividing the temperature rise heating stage by using switching time points included in the temperature rise heating stage;

determining core temperatures of the to-be-heated food in a process of temperature rise from a preset initial value to a fifth temperature value, the number of the core temperatures being less than or equal to the number of the sub-heating stages;

allocating the core temperatures to the sub-heating stages, the core temperature of a next sub-heating stage being greater than or equal to that of a previous sub-heating stage in time order; and determining heating temperatures of a first heating tube and the second heating tube before and after the switching time point, wherein a first rule is that at the end of the last sub-heating stage, the heating temperature of one of the first heating tube and the second heating tube is the target temperature value, the heating temperature of the other heating tube is a sixth temperature value, and the sixth temperature value is obtained by subtracting the first preset value from the fifth temperature value, wherein a second rule is that magnitude relationships between heating temperatures of the first heating tube and the second heating tube are opposite in two adjacent sub-heating stages, wherein a third rule is that the heating temperature of one of the first heating tube and the second heating tube is a sum of the core temperature of the sub-heating stage and the first preset value, and the heating temperature of the other heating tube is equal to a difference between the core temperature of the sub-heating stage and the first preset value.

7. The method according to claim 6, wherein the step (a) further comprises the steps of:

for a constant temperature heating stage, determining heating temperatures before and after a switching time point of the constant temperature heating stage based on a fourth rule and a fifth rule, wherein the fourth rule is that the heating temperatures of the first heating tube and the second heating tube are the target temperature value and the sixth temperature value respectively or the sixth temperature value and the target temperature value respectively, wherein the fifth rule is that a magnitude relationship between the heating temperatures of the first heating tube and the second heating tube before the switching time point is opposite to a magnitude relationship between the heating temperatures of the first heating tube and the second heating tube after the switching time point.

* * * * *